United States Patent
Hirdina

(10) Patent No.: US 11,667,056 B2
(45) Date of Patent: Jun. 6, 2023

(54) INJECTION MOULDING MACHINE FOR CONTINUOUS PRODUCTION

(71) Applicant: KRONES AG, Neutraubling (DE)

(72) Inventor: Jochen Hirdina, Regensburg (DE)

(73) Assignee: KRONES AG

( * ) Notice: Subject to any disclaimer, the term of this patent is extended or adjusted under 35 U.S.C. 154(b) by 210 days.

(21) Appl. No.: 17/125,559

(22) Filed: Dec. 17, 2020

(65) Prior Publication Data
US 2021/0178635 A1   Jun. 17, 2021

(30) Foreign Application Priority Data

Dec. 17, 2019  (DE) ............. 10 2019 134 709.2

(51) Int. Cl.
| | |
|---|---|
| *B29C 45/17* | (2006.01) |
| *B29B 11/08* | (2006.01) |
| *B29C 45/18* | (2006.01) |
| *B29C 49/46* | (2006.01) |

(52) U.S. Cl.
CPC .......... *B29B 11/08* (2013.01); *B29C 45/1769* (2013.01); *B29C 45/18* (2013.01); *B29C 49/46* (2013.01); *B29C 2049/4635* (2013.01)

(58) Field of Classification Search
CPC ..... B29C 45/1769; B29C 49/28; B29C 49/46; B29C 5/18; B29C 49/02; B29C 49/06; B29C 49/0064; B29C 49/4205; B29C 49/12; B29C 2049/023; B29C 2049/4635; B29B 11/08; B29L 2031/7158
See application file for complete search history.

(56) References Cited

U.S. PATENT DOCUMENTS

| | | | |
|---|---|---|---|
| 2010/0187730 A1 | 7/2010 | Hintermeier | 364/538 |
| 2011/0298145 A1 | 12/2011 | Lappe et al. | 264/40.1 |
| 2015/0232283 A1* | 8/2015 | Bruch | B67C 7/0046 198/493 |
| 2020/0290260 A1 | 9/2020 | Hirdina et al. | B29C 49/4202 |

FOREIGN PATENT DOCUMENTS

| | | | | |
|---|---|---|---|---|
| DE | 10 2012 210 606 | | 12/2013 | ............. B29C 45/18 |
| DE | 10 2016 103 756 | | 9/2017 | ............. B29C 49/06 |
| EP | 2 3 92 447 | | 12/2011 | ............. B29C 49/42 |

OTHER PUBLICATIONS

Extended European Search Report issued in EP Patent Appln. No. 20000471.1-1014, dated Apr. 23, 2021, 5 pages.

* cited by examiner

*Primary Examiner* — Monica A Huson
(74) *Attorney, Agent, or Firm* — Hayes Soloway P.C.

(57) ABSTRACT

Apparatus for producing plastic material preforms, includes at least two preform manufacturing devices configured for producing the plastic material preforms from a plastic material, wherein the preform manufacturing devices each having preform transport devices. The apparatus includes a main transport device which is configured for transporting the plastic material preforms produced by the preform manufacturing devices and transported by the preform transport devices continuously along a predetermined main transport path, wherein the plastic material preforms are transferred to the main transport device by the production devices after their production.

13 Claims, 2 Drawing Sheets

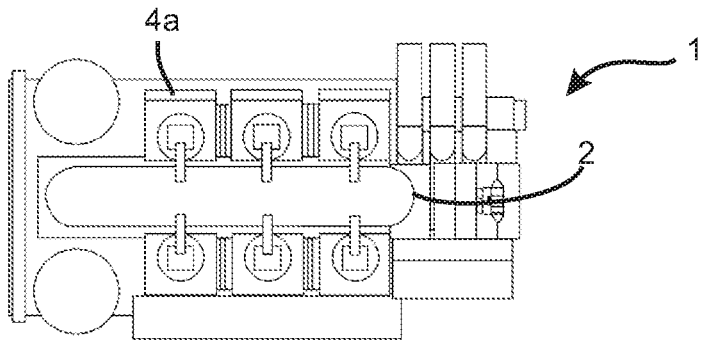
Fig. 3
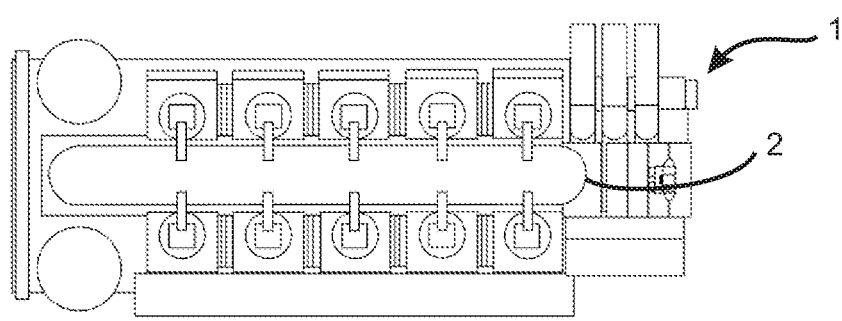
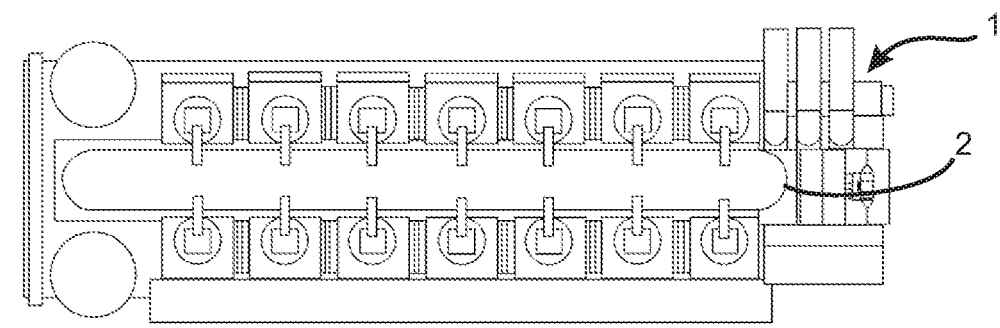
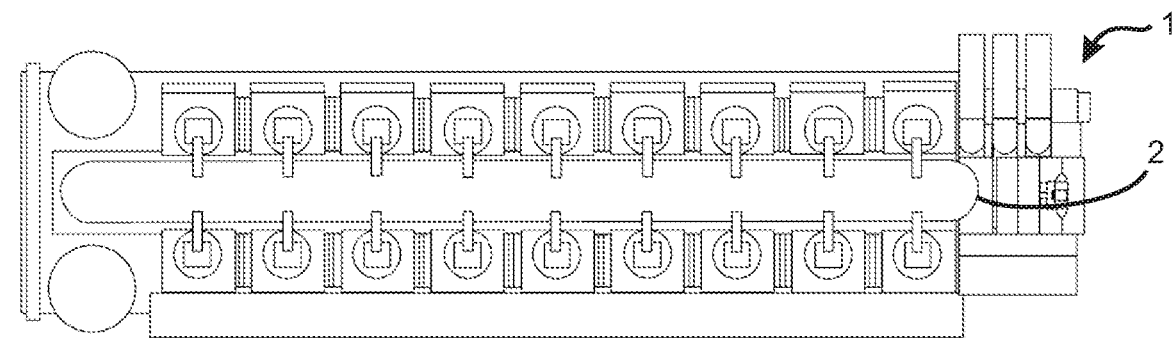

INJECTION MOULDING MACHINE FOR CONTINUOUS PRODUCTION

BACKGROUND OF THE INVENTION

The present invention relates to an apparatus and a method for manufacturing plastic material preforms. It is known from the state of the art that plastic material preforms are produced, for example, by means of an injection moulding machine. These plastic material preforms are then usually stored for the actual manufacturing process of plastic material bottles. For this purpose, the produced plastic material preforms are heated and fed to a forming device, such as a blow moulding machine.

The production of plastic material preforms, from which containers are then formed in a process such as stretch blow moulding or in a mould filling process with liquid filling material, is nowadays carried out predominantly in an injection moulding cycle. This means that several plastic material preforms (e.g. 48 to 196) are injection moulded simultaneously and then conveyed out of the machine in certain time cycles independent of the cycle time.

Direct blocking of an injection moulding process with a stretch blow-moulding machine (subsequent process step) is only possible with great restrictions due to the continuous operation of the stretch blow-moulding machine. One possible solution is a continuous injection moulding process, as it is to be realised in the future. But this technique also has some disadvantages, because the plastic melt has to be applied to a rotary system. Here, the material can be damaged and thus the quality of the plastic material preforms produced in this way can be impaired.

An object of the present invention is therefore providing an apparatus and a method which enable one or more injection moulding machines to be connected to a continuously operating machine.

SUMMARY OF THE INVENTION

An apparatus for manufacturing plastic material preforms according to the invention comprises at least two manufacturing devices which are suitable and intended for manufacturing the plastic material preforms from a plastic material, wherein the manufacturing devices each comprising preform transport devices.

According to the invention, the apparatus comprises a main transport device which is suitable and intended to continuously transport the plastic material preforms produced by the manufacturing devices and transported by the preform transport devices along a predetermined main transport path, wherein the plastic material preforms being transferable to the main transport device after production by the manufacturing devices.

It is therefore suggested that the apparatus here has at least two manufacturing devices for plastic material preforms, which preferably operate in a clocked mode, but transfer the plastic material preforms in a clocked mode to the continuously conveying main transport device.

The main transport device particularly preferably has a circulating transport means, such as in particular a transport chain, on which a plurality of gripping devices for gripping the plastic material preforms are arranged. Besides a circulating transport device in the transport chain, a circulating transport device in the form of a long stator linear motor can also be provided.

In a preferred embodiment, a preform transport device has a rotatable carrier which can transport at least the manufactured plastic material preforms. The invention thus offers the advantage that the plastic material preforms transported in cyclic operation can nevertheless be further conveyed by a continuously transporting transport device. In this way, the advantages of a continuous system can be used.

The heat of the plastic material preforms generated by the production process of the plastic material preforms can also be used to save energy, as subsequent heating of the plastic material preforms is either not necessary or only necessary to a lesser extent. Thus, for example, an expansion of the plastic material preforms can be directly connected to the production of the plastic material preforms.

Preferably, at least one manufacturing device for the manufacture of the plastic material preforms is an injection-compression moulding device. Here, for example, production cavities in which the plastic material preforms are manufactured can be arranged in a stationary position and the plastic material preforms produced in this way can be transported away in a clocked manner.

In this case, the apparatus as a whole could be constructed in a modular principle. For example, small standardised injection moulding modules could produce plastic material preforms and deliver them to a continuously running main transport device, for example a continuously running chain.

This main transport device can in turn transfer the plastic material preforms (directly or indirectly) to a conditioning station or a heating device for generating a heating profile to ensure better material distribution during stretch blow moulding. This heating device could be an infrared oven, for example, but it would also be possible to use a microwave oven.

In a preferred embodiment, the preform transport devices are suitable and intended to transport the plastic material preforms clocked and/or stepwise. It is also conceivable that the preform transport devices are suitable for transporting the plastic material preforms in such a way that the plastic material preforms are treated and/or produced during a standstill.

Particularly preferably, at least one manufacturing device has at least two manufacturing stations, which are suitable and intended for the production of plastic material preforms. For example, each manufacturing facility may have at least 2, but preferably a plurality of cavities in which the plastic material preforms are produced. It is possible to call each of these cavities a station, but it would also be possible for one station to have several cavities.

In a preferred embodiment, the manufacturing devices are located on an outer circumference of the main transport device. Several manufacturing devices may be arranged one after the other along a course of the main transport device.

In another advantageous embodiment, the apparatus has a reservoir for flowable plastic material and at least one supply line which conducts the plastic material from the reservoir to the manufacturing devices. In this case, for example, a main channel may be provided, which may already be the reservoir itself and from which numerous side channels branch off, wherein these side channels preferably lead to the individual manufacturing devices.

A central reservoir for all production facilities is preferred. For example, a plastic melt can be fed centrally via a channel and smaller channels branch off to the individual injection moulding modules or manufacturing devices. Through a combination, for example with compression moulding, it may be possible for example to dispense with a so-called shooting pot, which makes the entire system much more cost-effective.

In addition, by means of a short transfer distance to the main transport device or transport chain a delimitable installation space (this is only determined by the heating channel size) can be achieved.

In a preferred embodiment, the procedure described here is also particularly suitable for aseptic production of containers, as described in more detail below.

The manufacturing devices for plastic material preforms or injection moulding modules mentioned here can be produced cheaply in series production and the desired output can be designed (suitable for a subsequent stretch blow moulding machine) in a corresponding number. A complicated hot-runner technology is no longer necessary or can be greatly simplified. In addition, a concept can already be designed for a quick format change (much smaller masses are required) and a line express system can also be included.

In addition, a possible aseptic design could also bring great advantages. Since the plastic material preforms are sterile during injection moulding (melt at 285° C.) and this sterility is maintained by aseptic design, all decontamination units, such as sterilisation units and the like, could be dispensed with. In this way too, considerable costs can be saved.

In a preferred embodiment, the manufacturing devices each have at least one stationary manufacturing station, which is suitable and intended for the production of the plastic material preforms. Preferably, at least one manufacturing device and preferably several manufacturing devices have a plurality of stationary manufacturing stations which are suitable and intended for producing the plastic material preforms.

The present invention is further directed to a plant for the production of containers with an apparatus of the type described above as well as a manufacturing device for the production of plastic material containers arranged downstream of this apparatus in a transport direction of the plastic material preforms, wherein this further manufacturing device is preferable a device for forming plastic material preforms into plastic material containers.

The downstream machine is particularly preferably a blow-moulding machine which uses compressed air to convert heated plastic material preforms into plastic material bottles. However, it would also be possible to expand the heated plastic material preforms by means of a liquid product, especially a liquid and especially a liquid to be filled later.

In a further preferred embodiment, this manufacturing device has a further heating device which heats the plastic material preforms. In principle, it would be conceivable that the plastic material preforms are transferred to a moulding process, such as a blow moulding process, immediately after their production. However, it can be advantageous to connect another heating device in between to achieve a uniform temperature profile of the plastic material preforms.

Preferably a heating device is connected to the device described above. Here it is possible to dispense with a clocked supply, because the plastic material preforms are already conveyed singly on the main transport device. It is also possible to dispense with a pitch distortion, i.e. a change in the pitch between the plastic material preforms.

In a preferred embodiment, the manufacturing device is blocked with the device described here. This means that there is a synchronisation between the device described here and the downstream manufacturing device. In particular, transport speeds can be adapted to each other and changes in the speeds of one machine can lead to a change in the transport speeds of another machine due to the blocking.

In particular, the main transport device is blocked and/or synchronised with the following transport devices or following plant components.

In a further preferred embodiment, the manufacturing device is a sterile forming device for forming plastic material preforms into plastic material containers. This manufacturing device or forming device preferably has a plurality of forming stations within which the plastic material preforms are formed into plastic material containers. These forming stations can each have blow moulds which can be opened in order to insert plastic material preforms into them.

Preferably, the forming stations also have stretching bars, which are used to be inserted into the plastic material preforms in order to stretch them in their longitudinal direction.

The forming stations are preferably have in each case blow moulds, within which the plastic material preforms are formed into plastic material containers. These blow moulds can be opened in order to insert plastic material preforms. In addition, the forming stations are preferably equipped with stressing devices, which apply a fluid and especially gaseous medium to the plastic material preforms in order to expand them.

In a further preferred embodiment, this forming device has a clean room within which the plastic material preforms are transported. This clean room can surround the plastic material preforms or their transport path in a channel-like manner, for example. Particularly preferably this clean room is separated from a (non-sterile) environment by means of two walls that can be moved relative to each other.

As mentioned above, sterile machines are particularly suitable in this case, as the directly produced plastic material preforms are already sterile themselves.

The present invention is further directed to a method for producing plastic material preforms, wherein at least two manufacturing devices produce the plastic material preforms from a plastic material and wherein the manufacturing devices each comprise preform transport devices which transport the plastic material preforms.

According to the invention, the apparatus comprises a main transport device which continuously transports the plastic material preforms produced by the manufacturing devices and conveyed by the preform transport devices along a predetermined main transport path, wherein the plastic material preforms being transferred to the main transport devices by the production devices after their production.

It is therefore also proposed on the process side that the plastic material preforms produced by the manufacturing devices are continuously transported through the main transport device. The preform transport devices are particularly preferred to transport the plastic material preforms in a clocked manner and/or transport the plastic material preforms in such a way that the plastic material preforms are produced during a standstill of the preform transport devices.

This means that the plastic material preforms are particularly preferably fed from the manufacturing devices to different positions on the main transport device. It would be possible that the first manufacturing device in the transport direction of the plastic material preforms occupies a certain number of empty holding or gripping elements, but does not occupy other holding elements and other manufacturing devices then occupy further empty spaces.

Particularly preferably, the plastic material preforms are subsequently transported to a forming station. Furthermore, the main transport device is preferably synchronised with a transport device downstream of the main transport device in the transport direction of the plastic material preforms.

BRIEF DESCRIPTION OF THE DRAWINGS

Further advantages and embodiments are shown in the attached drawings:
Show in it:
FIG. 3 four illustrations of different machine configurations.

DETAILED DESCRIPTION OF THE INVENTION

Figure 1:
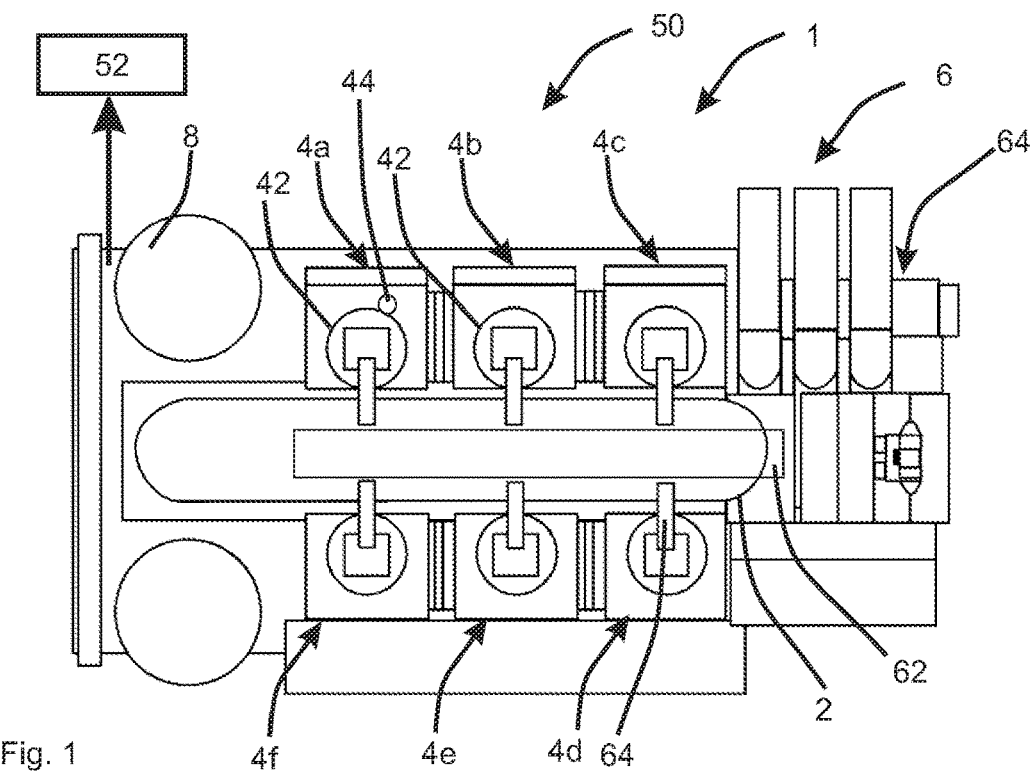
FIG. 1 an apparatus according to the invention in a schematic representation.

FIG. 1 shows a schematic representation of an apparatus 1 according to the invention for the production of plastic material preforms. This apparatus has a plurality, i.e. in the present case 6 manufacturing devices 4a, 4b, 4c, 4d, 4e, 4f, which each produce plastic material preforms.

Each of these individual manufacturing devices has a preform transport device 42, which is designed here as a carrier wheel. The reference sign 44 indicates (for simplification only one is shown) manufacturing units for plastic material preforms.

The preform transport device 42 transports the plastic material preforms produced in the treatment or manufacturing devices 44 and transfers them to a main transport device 2. This main transport device can be designed here as a handling chain on which a plurality of holding devices (not shown) for holding the plastic material preforms is arranged.

The reference sign 6 indicates an extrusion unit or reservoir for a plastic melt. This is conveyed via a main channel 62 and fed to the individual manufacturing devices via a plurality of secondary channels 64. The reference sign P (FIG. 2) indicates the transport path along which the manufactured plastic material preforms are transported.

The reference sign 8 identifies a transport star wheel which is connected to the main transport device 2. As mentioned above, the main transport device 2 continuously transports the produced plastic material preforms.

The reference sign 50 identifies a plant in its entirety. This is followed by a transport device 8 and another device, such as a stretch blow-moulding machine 52.

Figure 2:
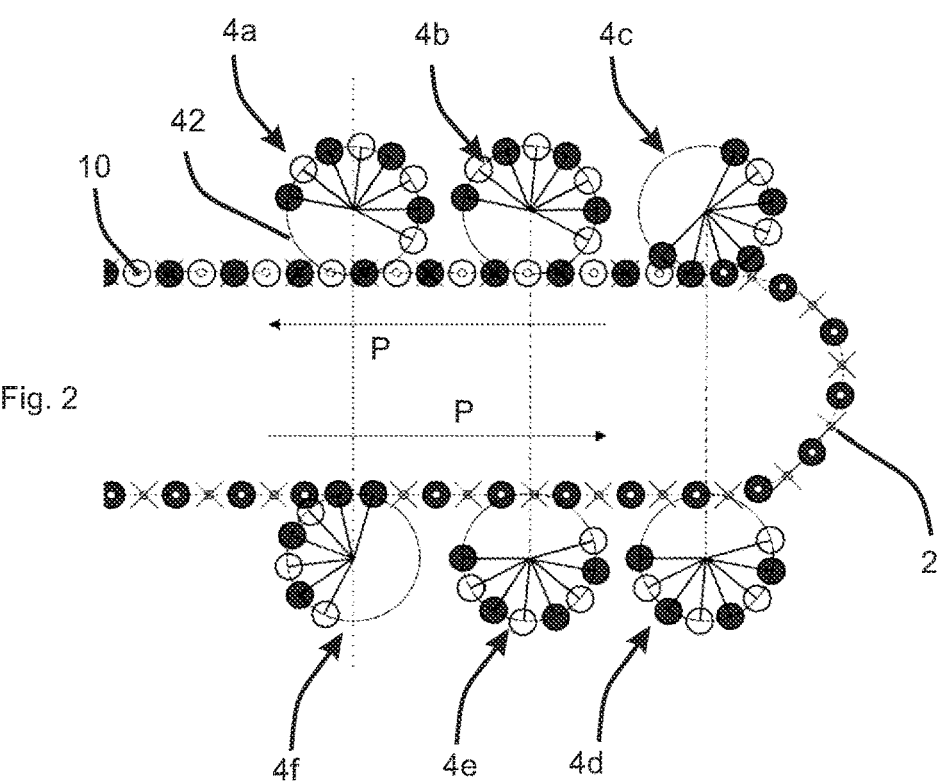
FIG. 2 an illustration to show the transfer of the plastic material preforms to the main transport device.

FIG. 2 illustrates the transfer of plastic material preforms to the main transport device 2. It can be seen that the main transport device 2 has a plurality of receiving and holding devices for the plastic material, and the individual manufacturing devices 4a to 4f (but in the reverse order 4f to 4a) can each transfer the plastic material preforms 10 to the main transport device 2. This transfer can be controlled in such a way that the respective preform transport devices of the manufacturing devices 4a to 4f can transfer the produced plastic material preforms to the main transport device in a clocked manner.

It is preferable that in a state of motion the preform transport devices are synchronised to a transport speed of the main transport device. In this way, a smooth transfer of the plastic material preforms to the main transport device is possible.

FIG. 3 shows four illustrations of different machine sizes. These machine sizes differ in particular in the number of the respective manufacturing devices 4a. As shown in the FIGS. 6, 10, 14 and 18 manufacturing devices may be provided.

The main transport device 2 is particularly preferred segmented in each case and can be lengthened or shortened if necessary. If a transport chain is provided, this can be done by lengthening a distance between the two deflection wheels and also by lengthening the length of the transport chain. If the main transport device is a linear stator unit, additional segments can also be used to extend the main transport device.

It is therefore particularly preferred that the main transport device is at least in sections segmented, so that it can be changed or adapted in terms of transport length.

The applicant reserves the right to claim all features disclosed in the application documents as being essentially inventive, provided that they are, individually or in combination, new compared to the prior art. It is further pointed out that the individual figures also describe features which may be advantageous in themselves. The skilled person recognises immediately that a certain feature described in a figure can be advantageous even without adopting further features from this figure. Furthermore, the skilled person recognises that advantages may also result from a combination of several features shown in individual or different figures.

LIST OF REFERENCE SIGNS 1 apparatus
2 main transport device
6 extrusion unit
8 transport star wheel
10 plastic material preforms
42 preform transport device
44 manufacturing units
50 plant in its entirety
64 secondary channels
4a-4f manufacturing devices
P transport path

The invention claimed is:

1. An apparatus for producing plastic material preforms, having at least two preform manufacturing devices which are configured for producing the plastic material preforms from a plastic material, wherein the preform manufacturing devices each having preform transport devices,
wherein the apparatus has a main transport device, which is configured for continuously transporting the plastic material preforms produced by the preform manufacturing devices and conveyed by the preform transport devices along a predetermined main transport path, wherein the plastic material preforms being transferable to the main transport devices by the perform manufacturing devices after their production, and
wherein the preform manufacturing devices each have at least one stationary manufacturing station which is configured for production of the preforms.

2. The apparatus according to claim 1,
wherein the preform transport devices are for transporting the plastic material preforms in a clocked manner and/or are configured for transporting the plastic material preforms in such a way that the plastic material preforms are produced during a standstill.

3. The apparatus according to claim 1,
wherein the preform manufacturing devices comprise at least two manufacturing stations which are configured for manufacturing the plastic preforms.

4. The apparatus according to claim 1,
wherein the apparatus comprises a reservoir for flowable plastic material and at least one supply line configured to conduct the plastic material from the reservoir to the preform manufacturing devices.

5. The apparatus according to claim 2,
wherein the preform manufacturing devices comprise at least two manufacturing stations which are configured for manufacturing the plastic preforms.

6. The apparatus according to claim 2,
wherein the apparatus comprises a reservoir for flowable plastic material and at least one supply line configured to conduct the plastic material from the reservoir to the preform manufacturing devices.

7. The apparatus according to claim 2,
wherein the preform manufacturing devices each have at least one stationary manufacturing station which is configured for producing the preforms.

8. The apparatus according to claim 3,
wherein the apparatus comprises a reservoir for flowable plastic material and at least one supply line configured to conduct the plastic material from the reservoir to the preform manufacturing devices.

9. The apparatus according to claim 3,
wherein the preform manufacturing devices each have at least one stationary manufacturing station which is configured for producing the preforms.

10. A plant for producing containers with an apparatus according to claim 1, and a further manufacturing device for producing plastic material containers arranged in a transport direction of the plastic material preforms after this apparatus, wherein this further manufacturing device comprises a device configured for forming plastic material preforms into plastic material containers.

11. The plant according to claim 10,
wherein the further manufacturing device is a sterile forming device configured for forming plastic material preforms into plastic material containers.

12. A method for producing plastic material preforms, wherein at least two preform manufacturing devices produce plastic material preforms from a plastic material, wherein the preform manufacturing devices each have preform transport devices configured to transport the plastic material preforms,
wherein apparatus has a main transport device configured to continuously conveys the plastic material preforms produced by the preform manufacturing devices and conveyed by the preform transport devices along a predetermined main transport path (P), wherein the plastic material preforms are transferred to the main transport device by the preform manufacturing devices after their production, and wherein the preform manufacturing devices each have at least one stationary manufacturing station which is configured for producing the preforms.

13. The method according to claim 12,
wherein the preform transport devices transport the plastic material preforms in a clocked manner.

\* \* \* \* \*